Patented Dec. 31, 1946

2,413,531

UNITED STATES PATENT OFFICE 2,413,531

PROCESS FOR PREPARING ZINC SALTS OF ARYL MERCAPTANS

John J. Verbanc, Tuxedo Park, Del., assignor to E. I. du Pont de Nemours & Company, Wilmington, Del., a corporation of Delaware No Drawing. Application November 16, 1944, Serial No. 563,806

6 Claims. (Cl. 260—429)

This invention relates to an improved process for preparing zinc salts of aryl mercaptans.

The zinc salts of aryl mercaptans have heretofore been prepared by reacting water soluble sodium mercaptides with water soluble salts of zinc, such as zinc sulfate, zinc acetate or zinc chloride. It has been found that this method for producing the zinc salts of the aromatic mercaptans is quite expensive because it involves several distinct steps and requires the use of large-volume equipment, for the solutions employed must be dilute. It has also been found that the resulting zinc salts of the mercaptans are obtained in such a very fine state of subdivision that they are difficult to filter, and therefore they are difficult to wash free from impurities so that the final product usually contains relatively large amounts of the inorganic salts which, in many cases, are detrimental to the subsequent use of the zinc salts of the aryl mercaptans. In most cases these salts must be dried and ground before they are in suitable physical form for use, which also requires special apparatus and utilization of considerable time in preparing them.

The object of this invention is to provide a new, improved method for preparing the zinc salts of aromatic mercaptans of the benzene and naphthalene series in good yields and in a high state of purity, and in such a form that they can be used directly either as solutions or in the isolated solid form.

I have found that the zinc salts of aromatic mercaptans of the benzene and naphthalene series can be prepared in good yields and in a high state of purity when an aromatic mercaptan, which contains no functional group other than the —SH group, is reacted with zinc oxide in an inert organic reaction medium in which the resulting zinc salt of the mercaptan may or may not be soluble.

Suitable solvents which may be employed are the oxygenated organic solvents, e. g., alcohols, ethers, ketones, keto-alcohols, or mixtures of these with hydrocarbons, e. g., xylene, benzene, gasoline, kerosene and the like, in which mixtures the resultant zinc salts are soluble. Alternatively, the reaction may be carried out in a hydrocarbon solvent alone, and the resultant zinc salts which are not soluble therein may be recovered readily, merely by filtering and drying. The salts thus obtained are in a powder form which need not be ground for ordinary use.

I have further found that this reaction between the mercaptan and zinc oxide is accelerated materially if there is added to the reaction mixture a small amount of an acid having a dissociation constant greater than $10^{-6}$, or a zinc or other soluble salt thereof.

The following examples are given to illustrate the invention. The parts used are by weight, unless otherwise specified.

EXAMPLE 1

A mixture of 200 parts of anhydrous isopropanol, 200 parts of xylene, 368 parts of mixed xylyl mercaptans (2.5 mol of 94% purity containing 0.3% sulfuric acid) and 103.2 parts of zinc oxide 1.26 mol) were placed in a reaction vessel and heated at 70° to 75° C. with agitation for a period of 2 hours, during which time the zinc oxide dissolved as indicated by the loss of milky coloration of the original reaction mass. At the end of the reaction cycle the mixture was cooled to from 25° to 30° C. and clarified by filtration. A theoretical yield of zinc xylyl mercaptide, as a clear solution containing 50% of zinc xylyl mercaptide, was obtained. The solution had a specific gravity of 1.034 at 25° C. Analysis of the solution: Calculated for 50% $(C_8H_9S)_2$ Zn: S=9.42%, Zn=9.60%; found: S=9.94%, Zn=9.59%.

In the following Examples 2, 3, 4, 5, 6, 8 and 12, and xylyl mercaptan used contained 0.3% of sulfuric acid, as in Example 1.

EXAMPLE 2

Using the technique described in Example 1, a number of charges of zinc xylyl mercaptide were prepared, using various combinations of solvents as reaction media. The data obtained in preparing these products is given in Table I.

TABLE I

*Preparation of zinc xylyl mercaptide in solution*

| Product number | Solvent mixture 50:50 by weight | Heating time in hours | Heating temperature | Specific gravity at 25° C. | Analysis [1] | |
|---|---|---|---|---|---|---|
| | | | | | Per cent S | Per cent Zn |
| | | | °C. | | | |
| 1 | Lorol and xylene | 4 | 70–75 | 1.06 | 10.48 | 9.76 |
| 2 | Dioxane and xylene | 4 | 70–75 | 1.12 | 10.00 | 9.47 |
| 3 | B-methoxy ethanol and xylene | 4 | 70–75 | 1.12 | 10.16 | 9.44 |
| 4 | Isobutyl alcohol and xylene | 4 | 70–75 | 1.03 | 10.08 | 9.44 |
| 5 | Methyl cellosolve and xylene | 4 | 70–75 | 1.09 | 10.08 | 9.40 |
| 6 | Terpineol and xylene | 4 | 70–75 | 1.10 | 10.24 | 9.56 |

[1] Theory S=9.42%, Zn=9.60%.

EXAMPLE 3

203 parts of isopropanol and 185 parts of solvent naphtha were charged into a reaction kettle. 368 parts of mixed xylyl mercaptan (2.5 mol of 94% purity) and 100 parts of zinc oxide were added and the resulting mixture heated at 70° to 75° C. for a period of 4 hours. During the heating, the zinc oxide dissolved as indicated by the disappearance of the milky coloration of the original reaction mass. At the end of the reaction, 8 parts of filter-aid were added, and after agitating for from 10 to 20 minutes the solution was filtered off. A theoretical yield of a clear amber-colored solution, containing 50% zinc xylyl mercaptide, was obtained. The solution had a specific gravity of 1.034 at 25° C. Analysis: Calculated for 50% $(C_8H_9S)_2$ Zn: S=9.42%, Zn=9.60%; found: S=10.20%, Zn=9.06%.

EXAMPLE 4

A mixture of 361 parts of mixed xylyl mercaptans (95% pure), 203 parts of isopropanol (91% by volume), 185 parts of xylene and 100 parts of zinc oxide were placed in a reaction vessel. The reaction mixture was then heated to from 70° to 75° C. for a period of 4 hours. 8 parts of filter-aid were then added, and the reaction mixture cooled, under agitation, to 30°–35° C. and filtered. The resulting solution had a clear amber color and an analysis as follows: Analysis for 50% $(C_8H_9S)_2$ Zn: Found: S=10.1%, Zn=9.33%; calculated: S=9.42%, Zn=9.60%. The specific gravity of the solution was 1.035 at 25° C.

50 parts of the above solution of zinc xylyl mercaptide were placed in a beaker and heated on a steam bath to remove the solvent. The 25 parts of residual solid was a light buff in color, which analyzed 18.76% S. Theoretical for $(C_8H_9S)_2$ Zn is 18.85% S.

The preparation of the zinc mercaptide solution proceeded similarly when the xylyl mercaptan contained, instead of sulfuric acid, 0.1% of hydrogen chloride, nitric acid, acetic acid, zinc sulfate, zinc chloride, zinc acetate, zinc nitrate, chromic chloride or ferric chloride. Without sulfuric acid or the other substances, the reaction was considerably slower.

EXAMPLE 5

A reaction vessel was charged with 100 parts of isopropanol, 100 parts of xylene, 184 parts of mixed xylyl mercaptan (94% purity) and 52 parts of zinc oxide. The resulting mixture was heated at from 30° to 35° C. for a period of 5 hours. During this period the zinc oxide dissolved, as indicated by the disappearance of milky coloration and the formation of a dark amber colored solution. At the conclusion of the reaction the product was clarified by filtration. An almost theoretical yield of a 50% solution of zinc xylyl mercaptide was obtained.

EXAMPLE 6

200 parts of isopropanol (91% by volume), 184 parts of xylyl mercaptan (94%) and 52 parts of zinc oxide were heated in a reaction vessel at from 70° to 75° C. for a period of 24 hours. The resulting solution was clarified by filtration. A theoretical yield of a clear amber-colored solution, containing 50% zinc xylyl mercaptide, was obtained.

EXAMPLE 7

320 parts of thio-alpha-naphthol containing 0.1% of zinc chloride (50% in kerosene solution), 41 parts of zinc oxide and 200 parts of dioxane were charged into a reaction vessel and heated at 100° C. for a period of 4 hours. During the heating cycle the zinc oxide dissolved, and the reaction mixture became dark brown in color. At the end of the reaction period, the product was filtered to remove excess zinc oxide. An almost theoretical yield of zinc thio-alpha-naphtholate (35% in solution) was obtained.

EXAMPLE 8

200 parts of anhydrous isopropyl alcohol, 184 parts of xylyl mercaptan and 52 parts of zinc oxide were charged into a glass reaction vessel and heated at from 70° to 75° C. for a period of 8 hours. The resulting solution was clarified by filtration. An almost theoretical yield of zinc xylyl mercaptide (50% solution) was obtained.

EXAMPLE 9

124 parts of acid-free, distilled tolyl mercaptan, 42 parts of zinc oxide and 150 parts of dioxane were charged into a glass reaction vessel and heated at 100° C. for a period of 4 hours. 10 parts of filter-cell were added, and the agitation continued for from 10 to 15 minutes. The resulting slurry was cooled to from 30° to 35° C., and filtered. An almost theoretical yield of zinc tolyl mercaptide (50% solution) was obtained.

EXAMPLE 10

110 parts of acid-free, distilled thio-phenol, 42 parts of zinc oxide and 165 parts of dioxane were charged into a glass reaction vessel and heated at 100° C. for a period of 5 hours. 10 parts of filter-cell were added, and, while agitating, the charge was cooled to 30°–35° C., and clarified by filtration. An almost theoretical yield of zinc thio-phenolate (50% solution) was obtained.

EXAMPLE 11

160 parts of thio-beta-naphthol containing 0.1% of sulfuric acid, 42 parts of zinc oxide and 500 parts of xylene were charged into a glass reaction vessel and heated at from 120° to 130° C. for a period of 6 hours. The resulting slurry was cooled to from 30° to 35° C., and filtered to remove the xylene. The resulting white solid was slurried with a small amount of alcohol to remove adhering xylene, and filtered. The resulting product was dried at 70° C. An almost theoretical yield of zinc thio-beta-naphtholate, as a white powder, was obtained.

EXAMPLE 12

Other solvents, as well as different temperatures and time of heating, may be employed, as illustrated in the following table:

*Preparation of zinc xylyl mercaptide in oxygenated solvents*

| Solvent used | Parts of solvent | Parts of mixed xylyl mercaptan | Parts of zinc oxide | Reactional time, hours | Reaction temperature, °C. | Per cent yield |
|---|---|---|---|---|---|---|
| Isopropyl alcohol (anhydrous) | 200 | 184 | 51.6 | 1 | 75 | 91.5 |
| Do | 200 | 184 | 51.6 | 4 | 75 | 93.4 |
| Do | 200 | 184 | 51.6 | 8 | 75 | 92.6 |
| Isopropyl alcohol (91% by volume) | 200 | 184 | 57.6 | 4 | 30–35 | 96 |
| Do | 400 | 368 | 103.2 | 2 | 60 | 95 |
| Beta-methoxy ethanol | 200 | 184 | 51.6 | 4 | 100 | 93 |
| Dioxane | 200 | 184 | 51.6 | 4 | 100 | 96.2 |
| Diacetone alcohol | 200 | 184 | 51.6 | 4 | 85–90 | 97.0 |

While the above examples serve to illustrate the methods of the present invention, it is apparent that many modifications can be made. The temperature may be varied within wide limits with equally good results. The temperature range of 10° to 250° C. is within practical limits. However, the preferred range is from 25° to 175° C. The most preferred range is between 25° C. and 125° C. The pressure may also be varied from atmospheric to that normally produced by the particular solvent or solvents employed at the chosen reaction temperature in a closed reaction vessel.

Ordinarily, approximately equivalent amounts of ZnO and mercaptan are used, although an excess of either ingredient is sometimes desirable. The course of the reaction may be followed by analysis. When no excess of ZnO is used and the zinc mercaptide is soluble in the solvent mixture, the end of the reaction is readily determined by the disappearance of the milkiness due to the suspended ZnO and the formation of a nearly clear solution.

A large variety of organic solvents may be employed as long as they are inert under the conditions of the reaction, such as alcohols, ketones, ketone alcohols, cyclic ethers, aliphatic ethers separately or in combination or in admixture with typical hydrocarbon solvents such as benzene, toluene, xylene, gasoline, kerosene and the like.

When organic liquids are used in which the resultant zinc aryl mercaptide is soluble, the concentration of zinc mercaptide can vary within wide limits, e. g., 10% to 75%, depending upon the solvent or solvent mixture employed and the zinc mercaptide to be manufactured. The most preferred range is from 25% to 75%. When liquids are used as reaction media in which the zinc aryl mercaptide is insoluble, the proportion of liquid may vary over a wide range, but is usually used in convenient amount to enable good agitation during the reaction.

To accelerate the reaction, any acid having a dissociation constant greater than $10^{-6}$ or a zinc or other soluble salt thereof, may be used. A number of these are illustrated following Example 4. As little as 0.01%, based on the mercaptan, is effective. The preferred amounts are between 0.1% and 0.5%, although 1% or more may be used. It is believed that the zinc salts are the active agents and that the free acids and the other salts added are transformed in the reaction mass to their zinc salts. The present invention is not to be limited to any such theory, however. Sulfuric acid is preferred.

In addition to the alkyl substituted mercaptans illustrated in the above examples, mercaptans substituted by other non-functional groups may also be employed, e. g., 2-chlorothiophenol, 4-chlorothiophenol or mixtures of these two compounds; 2-nitrothiophenol, 2-nitro-4-chlorothiophenol; 1-chloro-2-thionaphthol; 5-chloro-1-thionaphthol; 4-nitro-2-chlorothionaphthol; 4-ethoxythiophenol; tetrahydrothionaphthol, etc.

Our preferred method consists of reacting an aromatic mercaptan devoid of functional groupings with zinc oxide in the presence of a non-reactive organic solvent and a small amount of a soluble zinc salt at atmospheric pressure and at a temperature of from 25° to 125° C.

The products of the reactions are useful as processing agents for elastomers and may be employed in solutions, or they may be recovered from the solution by evaporation of the solvent or other means and used in the solid form.

Zinc salts of aromatic mercaptans in solid form have been found to be excellent processing agents for butadiene-styrene elastomers and other elastometric materials, producing polymers having improved millability and increased compounding rate. In addition, the softening effect produced by a chemical plasticizer makes it possible to exclude practically all of the oils, tars, pitches, bitumens, etc., which have heretofore been added to synthetic elastomers in order to improve their processing properties, and which are known to produce inferior vulcanizates. The organic solvent solutions of zinc mercaptides herein described have further been found to be tremendously superior as processing agents to solid zinc mercaptides, because they are (1) cheaper and easier to manufacture, (2) more efficient (a 50% solution of zinc xylyl mercaptide is equivalent weight for weight with the solid material), (3) the solutions are non-dusting and are safer to handle, and (4) they disperse completely in the butadiene-styrene elastomer, whereas the solid material has a tendency under certain conditions to pebble, thereby producing vulcanizates having inferior tensile and tear strengths.

In the examples in this specification the xylyl mercaptan employed, when in pure form, contains about 85% of meta-xylene mercaptan, the remainder being the ortho- and para-isomers.

I claim:

1. The process for preparing zinc salts of aromatic mercaptans of the benzene and naphthalene series which comprises reacting the mercaptan, which carries no other functional group, with zinc oxide in an inert organic reaction medium at temperatures of from 10° to 250° C.

2. The process for preparing zinc salts of aromatic mercaptans of the benzene and naphthalene series which comprises reacting the mercaptan, which carries no other functional group, with zinc oxide in an oxygenated organic solvent which is inert under the conditions of the reaction, at temperatures of from 25° to 125° C.

3. The process for preparing zinc salts of aromatic mercaptans of the benzene and naphthalene series which comprises reacting the mercaptan, which carries no other functional group, with zinc oxide in a mixed organic solvent which is inert under the conditions of the reaction and at least 10% of which is an oxygenated organic solvent, at temperatures of from 25° to 125° C.

4. The process for preparing organic solvent solutions of zinc xylyl mercaptide which comprises reacting the xylyl mercaptan with zinc oxide in an inert organic solvent consisting of at least 10% of an oxygenated organic solvent, at temperatures of from 25° to 125° C.

5. The process for preparing zinc salts of aromatic mercaptans of the benzene and naphthalene series which comprises reacting the mercaptan, which carries no other functional group, with zinc oxide in the presence of at least 0.01% of a compound of the class consisting of an acid having a dissociation constant greater than $10^{-6}$ and the water soluble metal salts thereof, and in an oxygenated organic solvent which is inert under the conditions of the reaction, at temperatures of from 25° to 125° C.

6. The process for preparing zinc salts of aromatic mercaptans of the benzene and naphthalene series which comprises reacting the mercaptan, which carries no other functional group, with zinc oxide in the presence of at least 0.01% of sulfuric acid, and in an oxygenated organic solvent which is inert under the conditions of the reaction, at temperatures of from 25° to 125° C.

JOHN J. VERBANC.